United States Patent
Henriksson et al.

(10) Patent No.: US 10,820,217 B2
(45) Date of Patent: Oct. 27, 2020

(54) METHOD AND RADIO NODE OF A WIRELESS COMMUNICATION NETWORK FOR HANDLING OF CELL IDENTITIES

(71) Applicant: Telefonaktiebolaget LM Ericsson (publ), Stockholm (SE)

(72) Inventors: Daniel Henriksson, Linköping (SE); Tobias Ahlström, Ljungsbro (SE); Stefan Engström, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/337,473

(22) PCT Filed: Oct. 28, 2016

(86) PCT No.: PCT/SE2016/051053
§ 371 (c)(1),
(2) Date: Mar. 28, 2019

(87) PCT Pub. No.: WO2018/080359
PCT Pub. Date: May 3, 2018

(65) Prior Publication Data
US 2019/0230530 A1    Jul. 25, 2019

(51) Int. Cl.
*H04W 24/04*     (2009.01)
*H04W 8/26*      (2009.01)
(Continued)

(52) U.S. Cl.
CPC ............ *H04W 24/04* (2013.01); *H04W 8/26* (2013.01); *H04W 76/11* (2018.02); *H04W 76/25* (2018.02); *H04W 8/30* (2013.01)

(58) Field of Classification Search
CPC ....... H04W 24/04; H04W 76/25; H04W 8/26; H04W 8/30
See application file for complete search history.

(56) References Cited

U.S. PATENT DOCUMENTS

2010/0008235 A1* 1/2010 Tinnakornsrisuphap .................. H04L 29/12264
370/241
2017/0006479 A1* 1/2017 Smith .................. H04W 24/02

FOREIGN PATENT DOCUMENTS

EP    2134111 A1    12/2009
EP    2405682 A2    1/2012
(Continued)

OTHER PUBLICATIONS

European Search Report for European Patent Application No. EP 16920123.3 dated Oct. 8, 2019, 3 pages.
(Continued)

*Primary Examiner* — Chi H Pham
*Assistant Examiner* — Ji-Hae Yea
(74) *Attorney, Agent, or Firm* — Sage Patent Group (57) ABSTRACT

The invention describes a method for handling of cell identities, performed by a first radio node of a wireless communication network providing radio coverage to a first cell. The first radio node is connected to at least one second radio node providing radio coverage to a second cell. The first cell has been assigned a first cell identity, and each of the second cells has been assigned an individual cell identity. The method comprises: determining that the first cell identity is the same as the cell identity assigned to one of the second cells; triggering change of cell identity for the first cell from the first cell identity to a second cell identity that is not used for any of the second cells, and sending, to the at least one second radio node, information on the change of cell identity from the first cell identity to the second cell identity.

18 Claims, 9 Drawing Sheets

(51) Int. Cl.
*H04W 76/25* (2018.01)
*H04W 76/11* (2018.01)
*H04W 8/30* (2009.01)

(56) References Cited

FOREIGN PATENT DOCUMENTS

WO  WO 2013/155643 A1  10/2013
WO  WO 2016/011078 A1  1/2016
WO  WO 2016/154604 A1  9/2016

OTHER PUBLICATIONS

International Search Report and Written Opinion of the International Searching Authority, PCT/SE2016/051053, dated Jun. 14, 2017, 9 pages.
3GPP TS 36.412 V13.0.0 (Dec. 2015), 3rd Generation Partnership Project; Technical Specification Group Radio Access Network; Evolved Universal Terrestrial Radio Access Network (E-UTRAN); S1 signalling transport (Release 13), 8 Pages.

\* cited by examiner

METHOD AND RADIO NODE OF A WIRELESS COMMUNICATION NETWORK FOR HANDLING OF CELL IDENTITIES

CROSS REFERENCE TO RELATED APPLICATIONS

This application is a 35 U.S.C. § 371 national stage application of PCT International Application No. PCT/SE2016/051053 filed on Oct. 28, 2016, the disclosure and content of which is incorporated by reference herein in its entirety.

TECHNICAL FIELD

The present disclosure relates generally to a method for handling of cell identities, performed by a first radio node of a wireless communication network. Further, the present invention relates to first radio node operable in a wireless communication network and arranged for handling of cell identities.

BACKGROUND

Figure 1:
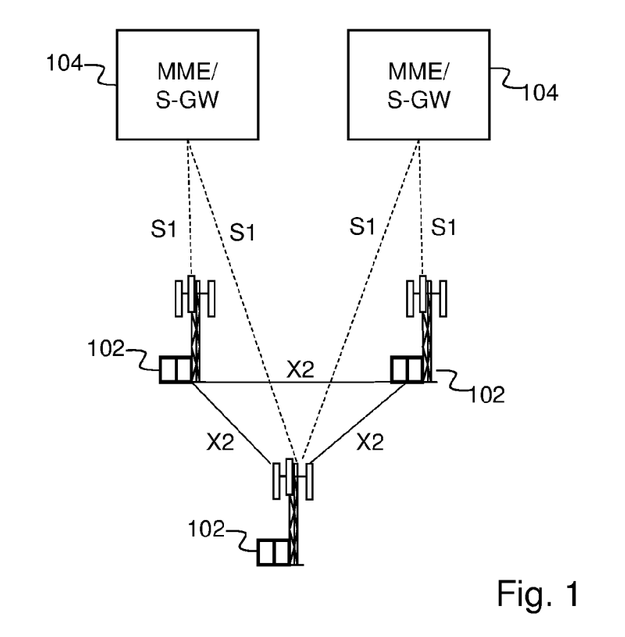
FIG. 1 is a schematic block diagram of a radio access network architecture according to the prior art, in which the present invention may be used.

The third generation partnership project, 3GPP, is currently working on standardization of the Evolved UMTS Terrestrial Radio Access Network, E-UTRAN, radio access system, also called Long Term Evolution, LTE. LTE is part of the Evolved Packet System, EPS, also constituting the Evolved Packet Core, EPC. The architecture of the LTE is shown in FIG. 1, including radio access nodes, such as eNodeBs 102, and EPC nodes, such as Mobility Management Entity/Serving Gateway, MME/S-GW 104. The interface between eNodeBs 102 is referred to as X2, and the interface between an eNodeB 102 and an MME/S-GW 104 is denoted S1. The signaling transport over X2 and S1 are implemented via Stream Control Transmission Protocol, SCTP, see for example 3GPP TS 36.412. Each eNodeB provides radio access to User Equipment, UEs, which are situated within a cell of the eNodeB. In other words, the eNodeB provides radio coverage within a geographical area defined as the cell of the eNodeB.

Figure 2:
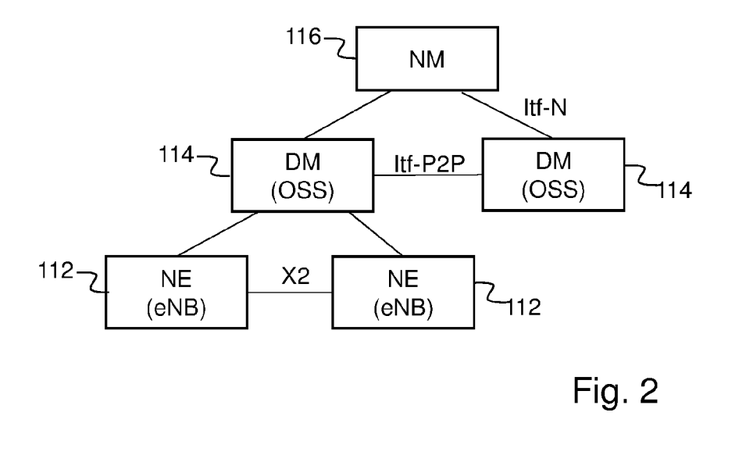
FIG. 2 is a schematic block diagram of a management network architecture according to the prior art, in which the present invention may be used.

The LTE is controlled and managed by a management system. Such a management system is shown in FIG. 2. The management system comprises network elements, NE 112, which are managed by a domain manager, DM 114, also referred to as the operation and support system, OSS. The NE 112 is a node of the E-UTRAN, such as an eNodeB, eNB, or a MME/S-GW. The DM 114 may further be managed by a network manager, NM 116. Two NEs 112 are interfaced by X2, in case the NEs are eNBs, whereas the interface between two DMs 114 is referred to as Itf-P2P. The interface between the NM 116 and a DM 114 is called Itf-N. The management system may be arranged to configure the NEs, as well as receive observations associated with features in the NEs. For example, the DM 114 observes and configures NEs 112, while the NM 116 observes and configures the DMs 114, as well as the NEs 112 via the DM. Management information describing the current configuration of an eNB may also be transferred over the X2 interface to neighbor eNBs.

In an LTE-based communication network there are a couple of different identities for each cell. Two examples of cell IDs are an E-utran Cell Global Identity, ECGI, and a Physical Cell Identity, PCI. The ECGI is a unique ID of a cell while the PCIs are reused in a network and therefore many cells can have the same PCI. The PCI is for example used during handovers, HO, between cells. The UE then identifies the target cell by determining the PCI.

Figure 3:
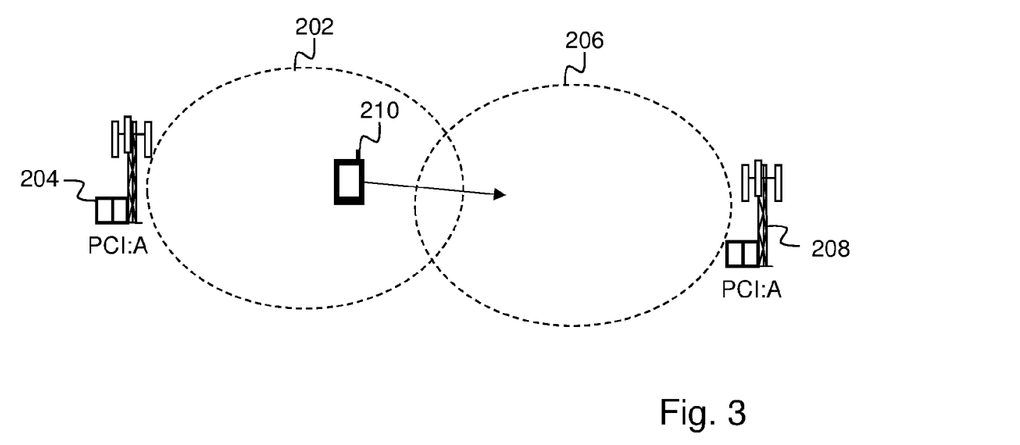
FIGS. 3-4 are schematic overviews illustrating communication scenarios where PCI conflicts may occur.

In LTE there are 504 different PCIs, which means that an LTE network needs to be carefully planned since it is unfavorable that two neighbor cells have the same PCI. This situation is often described as a PCI conflict. FIG. 3 illustrates such a situation where a first cell 202 of a first eNB 204 has the same PCI as a neighboring second cell 206 of a second eNB 208. When a UE 210 moves from the first cell 202 towards the second cell 206, it will not initiate a HO as the PCI is the same in the two cells. Instead it will lead to a lost connection, i.e. drop, between the first cell 202 and the UE 210, as the UE moves away from the first cell.

Figure 4:
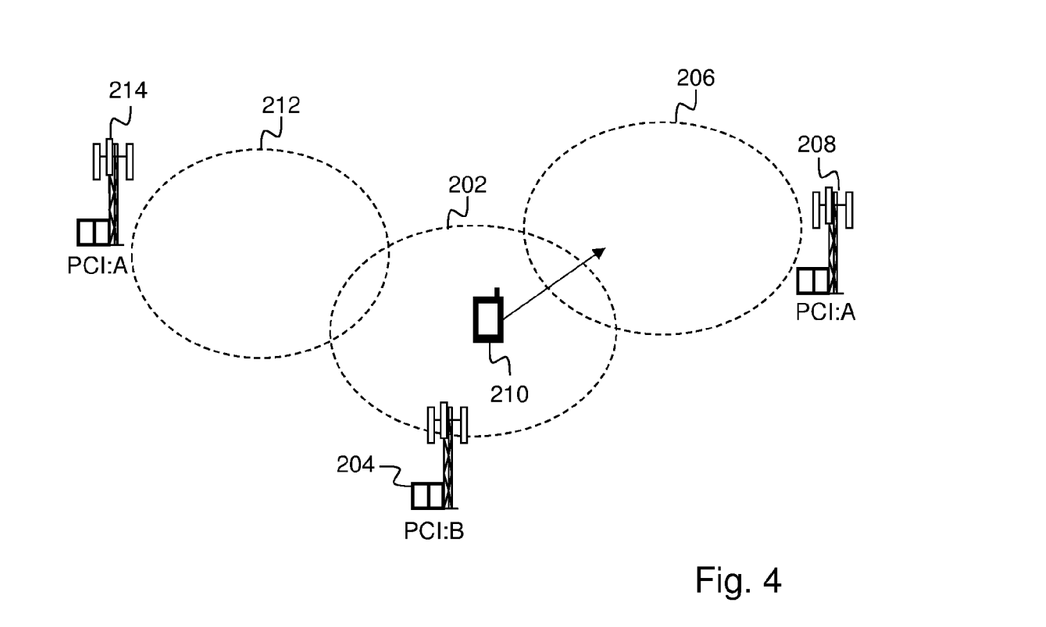

Another situation that may cause a PCI conflict is when one cell has two neighbor cells with the same PCI. This is illustrated in FIG. 4. In this case the UE 210 is moving from the first cell 202 towards the neighboring second cell 206 and should then be handed over from the first cell 202 to the second cell 206. The UE 210 reports to the eNB 204 that a cell with PCI A is a suitable target. However, since the first cell 202 has two neighbor cells, the second cell 206 and a third cell 212 managed by a third eNB 214, with PCI A, the first cell 202 does not know which one of the second cell and the third cell that is the target cell. If the HO is done towards the third cell 212, the connection to the UE 210 will be lost.

In both two cases illustrated in FIG. 3 and FIG. 4 it might only be a temporary loss of connection for the UE that may later be re-established, but that is still a drawback since it both requires extra signaling and results in degraded throughput to the UE. One existing solution for handling such PCI conflicts is to thoroughly plan the PCIs in the network and do central re-planning when a new case of PCI conflict is detected. Such central re-planning is performed by a deciding node, such as e.g. a DM 114 or an NM 116 (see FIG. 2). This requires signaling from the NEs involved in the conflict or at least from the node detecting the conflict, to the DM or NM. It also needs signaling from the DM/NM to the involved NEs ordering one or more of the NEs to change the PCI of its cell experiencing the PCI conflict. In addition to that, the deciding node, i.e. the DM or NM, needs to gather information about the conflicting nodes.

Figure 5:
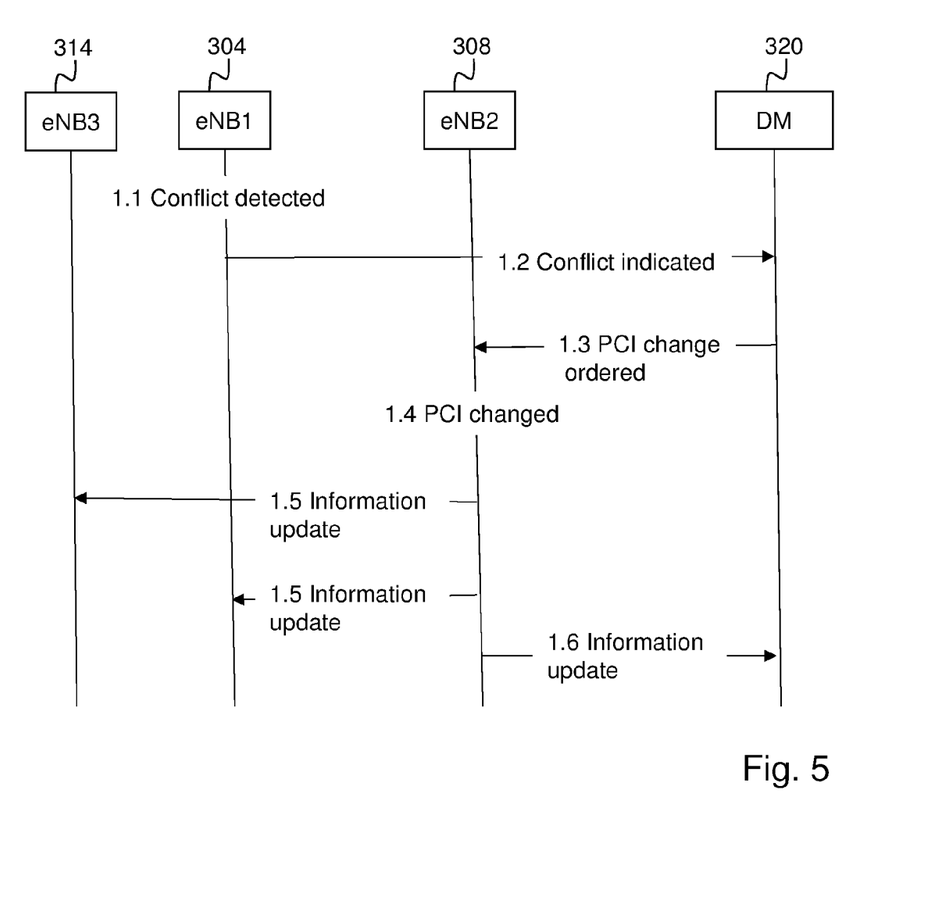
FIGS. 5-6 are sequence diagrams describing prior art methods for resolving PCI conflicts.

If the PCI conflict is going to be resolved manually, the time from detecting the conflict to resolving the conflict can be unnecessary long. An example of schematic signaling needed to resolve the conflict is shown in FIG. 5. Here a first eNB 304 detects 1.1 that it has a PCI conflict situation for two of its neighboring eNBs; eNB2 308 and eNB3 314. The first eNB 304 sends a signal 1.2 indicating the conflict to a network node, in this case a DM 320 responsible for resolving the conflict. When the conflict situation has been evaluated at the DM 320, automatically or manually, one of the two eNBs that has the PCI conflict, in this example eNB2 308 is ordered 1.3 to change PCI on the conflicting cell. When the PCI is changed 1.4, the eNB2 308 informs all the neighbors, i.e. eNB1 304 and eNB3 314, about the new setting, in an information update 1.5. The eNB2 308 also informs 1.6 the DM 320 in order to keep the information about the network up to date, otherwise the DM cannot make the correct evaluation and conflict resolving for any following PCI conflict. Such a centralized method for managing PCI conflicts means a lot of signaling between the eNBs and the responsible network node. Further, especially for a large network, a lot of data, e.g. PCI information and neighbor information, need to be stored at the network node.

Another method for resolving a PCI conflict is to use the X2 connections (see FIG. 1) between the eNBs involved to change PCI autonomously. This means that then the eNBs involved in a conflict would change PCI when detecting a PCI conflict, without relying on another network node such as a DM. This requires that all the information about cell neighbors, to the own cell or cells in an eNB, is sent to all the neighbor eNBs. The X2 connections can also be used for informing about settings on a neighbor node's neighbor. This means that an eNB can collect and store information about neighbor cells and neighbors' neighbor cells. Based on the gathered information, an eNB that has a cell with conflicting PCI, can detect the PCI conflict and change its PCI. A high level signaling chart for such a method is found in FIG. 6.

Figure 6:
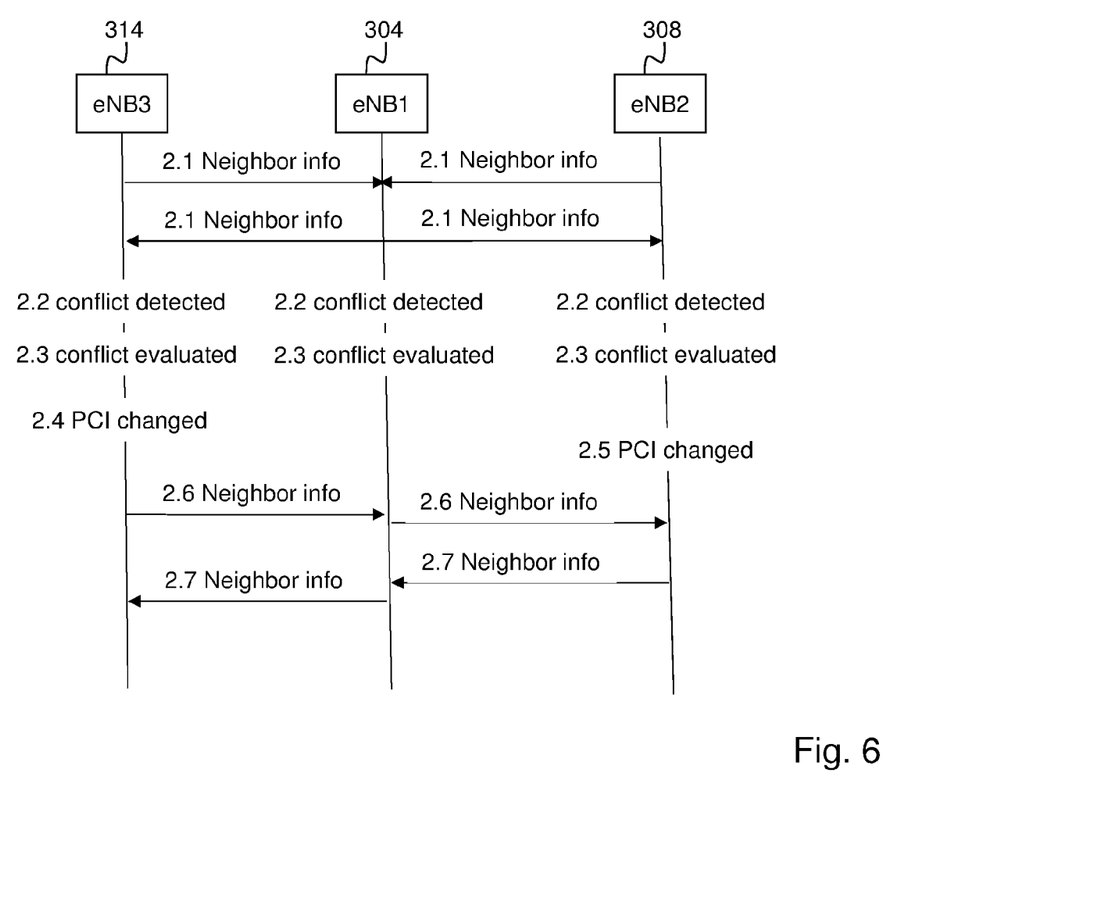

In the example of FIG. 6 there are three eNodeBs, eNB1 304, eNB2 308 and eNB3 314. The three eNBs exchange 2.1 neighbor information about PCIs used for cell neighbors to the cells controlled by the respective eNB. When all information is gathered, the three eNBs 304, 308, 314 can detect 2.2 if there is a PCI conflict by checking the PCI values for each of the neighboring cells and can evaluate 2.3 how to resolve the conflict. The eNBs can then change 2.4 the PCI of the cell that experienced the conflict in order to resolve the conflict. When a PCI is changed, the eNB informs 2.6, 2.7 all neighbor eNBs about the PCI change. However, as indicated in FIG. 6, there is a risk that the eNBs that have cells included in the conflict may change PCI very close in time. This is indicated in FIG. 6 by the PCI change 2.4 of eNB3 and the PCI change 2.5 of eNB2. As could be seen here, eNB2 and eNB3 change PCI before they get to know that the other eNB has changed the PCI of its conflicting cell. This results in unnecessary disturbance to the traffic in the network and unnecessary signaling because of one of the PCI changes which was unnecessary. In other words, here only the first PCI change 2.4 of the eNB3 and its corresponding exchange of neighbor information 2.6 was necessary whereas the other PCI change 2.5 of the eNB2 occurring a little bit later and its corresponding exchange of neighbor information 2.7 was unnecessary.

Consequently, there is a need of an improved method for handling PCI conflicts that is more signaling efficient than the existing methods.

SUMMARY

It is an object of the invention to address at least some of the problems and issues outlined above. According to at least some embodiments, it is an object to achieve an improved method for handling PCI conflicts in a wireless communication network. It is possible to achieve these objects and others by using methods and radio nodes as defined in the attached independent claims.

According to one aspect, a method is provided for handling of cell identities, the method being performed by a first radio node of a wireless communication network. The first radio node provides radio coverage to a first cell. The first radio node is connected to at least one second radio node, each second radio node providing radio coverage to a second cell. Further, the first cell has been assigned a first cell identity, and each of the second cells has been assigned an individual cell identity. The method comprises determining, based on information on the first cell identity and on the cell identities assigned to the second cells, that the first cell identity is the same as the cell identity assigned to one of the second cells, The method further comprises triggering change of cell identity for the first cell, based on the result of the determining, from the first cell identity to a second cell identity that is not used for any of the second cells, wherein the change of cell identity is triggered at a time point corresponding to a time delay from the determining to the triggering that is dependent on a total number of vacant cell identities for the first cell so that the time delay is shorter the more vacant cell identities there are for the first cell. Further, the method comprises sending, to the at least one second radio node, information on the change of cell identity from the first cell identity to the second cell identity.

According to another aspect, a first radio node is provided, which is operable in a wireless communication network and arranged for handling cell identities. The first radio node is arranged to provide radio coverage to a first cell. The first radio node is further connected to at least one second radio node, each second radio node being arranged to provide radio coverage to a second cell. The first cell has been assigned a first cell identity, and each of the second cells has been assigned an individual cell identity. The first radio node comprises a processor and a memory. The memory contains instructions executable by said processor, whereby the first radio node is operative for determining, based on information on the first cell identity and on the cell identities assigned to the second cells, that the first cell identity is the same as the cell identity assigned to one of the second cells. The first radio node is further operative for triggering change of cell identity for the first cell, based on the result of the determining, from the first cell identity to a second cell identity that is not used for any of the second cells, wherein the change of cell identity is triggered at a time point corresponding to a time delay from the determining to the triggering that is dependent on a total number of vacant cell identities for the first cell so that the time delay is shorter the more vacant cell identities there are for the first cell. The first radio node is further operative for sending, to the at least one second radio node, information on the change of cell identity from the first cell identity to the second cell identity.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to make the resolving of PCI conflicts in a wireless communication network more signaling efficient compared to existing methods. This is achieved by the conflicting eNBs triggering change of their respective PCI values at time points from obtaining the information of the conflict that are different for the involved eNBs. This is accomplished by setting the time points for the respective cells dependent on the available free space of PCI values for the respective cells. The free PCI values are values that can be selected by the eNB without causing any new conflict with another cell. The eNB that has changed the PCI value of its cell first then signals the new PCI value to the neighbor eNBs. As the triggers of a PCI change between involved cells by this method are spread out in time, the eNB that changed its PCI value first most probably has informed the other eNB before the other eNB has triggered change of the PCI value of its cell. The other eNB can then abort its triggering of PCI change before it is performed. Consequently, traffic disturbance is reduced and signaling resources are spared compared to today's methods. Further, by letting the cell having the most vacant PCI values change first, as in the described embodiment, the cell that has the best possibilities to find a free PCI value has its PCI value being triggered to be changed first, which results in a good usage of the available vacant PCIs.

Figure 7:
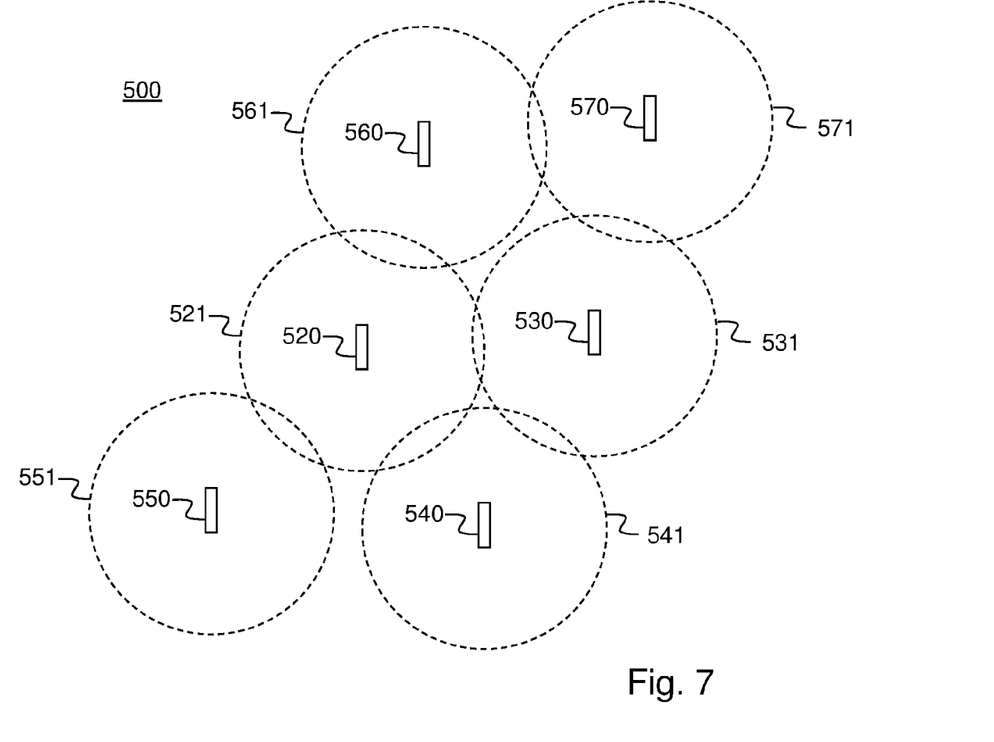
FIG. 7 is a schematic overview of a cell structure of a wireless communication network.

FIG. 7 shows an example of a wireless communication network 500 in which the present invention can be use. The wireless communication network 500 comprises a first radio node 520 that provides radio coverage to a geographical area defined as a first cell 521. The wireless communication network further comprises a plurality of second radio nodes 530, 540, 550, 560, 570, each second radio node providing radio coverage to a second cell 531, 541, 551, 561, 571. The second cells 531, 541, 551, 561 are neighbors to the first cell, which means that they have a border that is adjacent to the border of the first cell. However, the expression second cell may also comprise a neighbor's neighbor to the first cell, which means that such a second cell has a border to a neighbor of the first cell. Cell 571 of FIG. 7 is such a neighbor's neighbor cell. A radio node is arranged to provide wireless radio connection to wireless communication devices that are residing in the cell of the respective radio node. A radio node may be for example a radio base station, an eNodeB, a radio head or radio unit of a distributed base station or an access point of e.g. a Wireless Local Area Network, WLAN. A wireless communication device may be any kind of device having wireless communication abilities for communication with the radio node of the communication network, such as a mobile phone, a laptop, a palmtop, a machine communication device, a UE etc. A wireless communication network may be a network based on e.g. Global System for Mobile communication, GSM, Code Division Multiple Access, CDMA, Wideband CDMA, W-CDMA, CDMA2000, General Packet Radio Services, GPRS, EDGE, 3G, LTE, WLAN, New Radio, NR, etc.

Figure 8:
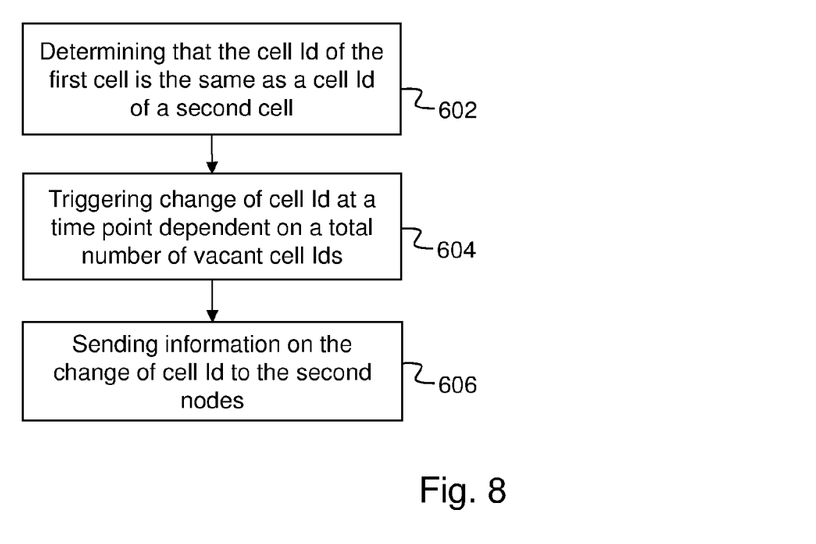
FIGS. 8-10 are flow charts describing methods for handling PCI conflicts according to different possible embodiments.

FIG. 8, in conjunction with FIG. 7, illustrates a method according to an embodiment, for handling of cell identities, performed by a first radio node 520 of a wireless communication network 500. The first radio node 520 provides radio coverage to a first cell 521, and the first radio node is connected to at least one second radio node 530, 540, 550, 560, 570, either directly or via a neighbor (as for second radio node 570). Each second radio node provides radio coverage to a second cell 531, 541, 551, 561, 571. Further, the first cell has been assigned a first cell identity, and each of the second cells has been assigned an individual cell identity. The method comprises determining 602, based on information on the first cell identity and on the cell identities assigned to the second cells 531, 541, 551, 561, 571, that the first cell identity is the same as the cell identity assigned to one of the second cells. The method further comprises, based on the result of the determining, triggering 604 change of cell identity for the first cell 521, from the first cell identity to a second cell identity that is not used for any of the second cells, wherein the change of cell identity is triggered at a time point corresponding to a time delay from the determining 602 to the triggering 604 that is dependent on a total number of vacant cell identities for the first cell so that the time delay is shorter the more vacant cell identities there are for the first cell. The method further comprises sending 606, to the at least one second radio node, information on the change of cell identity from the first cell identity to the second cell identity.

The "cell identity" may be a non-unique cell identity, i.e. a cell identity where the same identity may be used simultaneously for different cells in the network, such as the LTE definition Physical Cell Identity, PCI. This is in contrast to a unique cell identity for which each cell in a network has a unique identity, i.e. a global cell identity such as the LTE E-UTRAN Cell Global Identity, ECGI. Even though the network in FIG. 7 is denoted as having one cell per radio node, the first radio node, as well as the at least one second radio node, may provide radio coverage to more than one cell each. For example, a radio node may provide radio coverage to two or more sector cells. The time delay for triggering change of the cell identity, Id, for the first cell is preferably so much shorter than the corresponding time delay for the triggering of change of cell Id for the second cell, that the one of the at least one second radio node handling the one of the second cell has received the informed of the cell Id change for the first cell before it has triggered cell Id change for the one of the second cell. The information on the change of cell Id sent from the first cell to the at least one second cells comprises at least the first cell Id. However, the information may also comprise the second cell Id. According to an embodiment, the method may further comprise receiving the information on the cell identities assigned to the second cells. This information may be received from one or more of the at least one second radio node or from a management node. The vacant cell identities are cell identities that are selectable for the cell and that can be selected for the cell without causing any cell identity conflict with any of the second cells.

By setting the time delay for triggering change of the cell identity dependent on the number of vacant cell identities at a radio node, the time delay for changing cell identity will be individual for different cells, i.e. the time point for triggering cell identity change will be spread out between the different cells in a network, as long as the number of vacant cell identities are different, thus avoiding a collision of cell identity change, i.e. that the cell identity for two different cells that determine they have the same cell identity is changed at approximately the same time. By making the cell identity change time delay dependent on the number of vacant cell identities at a radio node, the cell of the cells experiencing a cell identity collision that has the most number of vacant cell identities can be triggered to make a cell change first, thus equaling out the number of free cell identities between the radio nodes in a network. As a result, the performance of the network is increased. As the information of cell identity change performed is sent to the at least one second radio node, the second radio node also experiencing the cell identity collision but having a lower number of vacant cell identities than the first radio node can stop its own triggering of cell identity change before its own time point for cell change occurs.

According to an embodiment, the time delay difference between a first number of vacant cell identities and a first plus one number of vacant cell identities is longer than the time it takes to change cell ID and inform neighboring cells of the change of cell ID. Consequently, even if the difference between numbers of vacant cell Ids between two cells are only one, the cell with the higher number of vacant Ids manages to inform the other cell of its change before the other cell has triggered its cell Id change.

Figure 9:
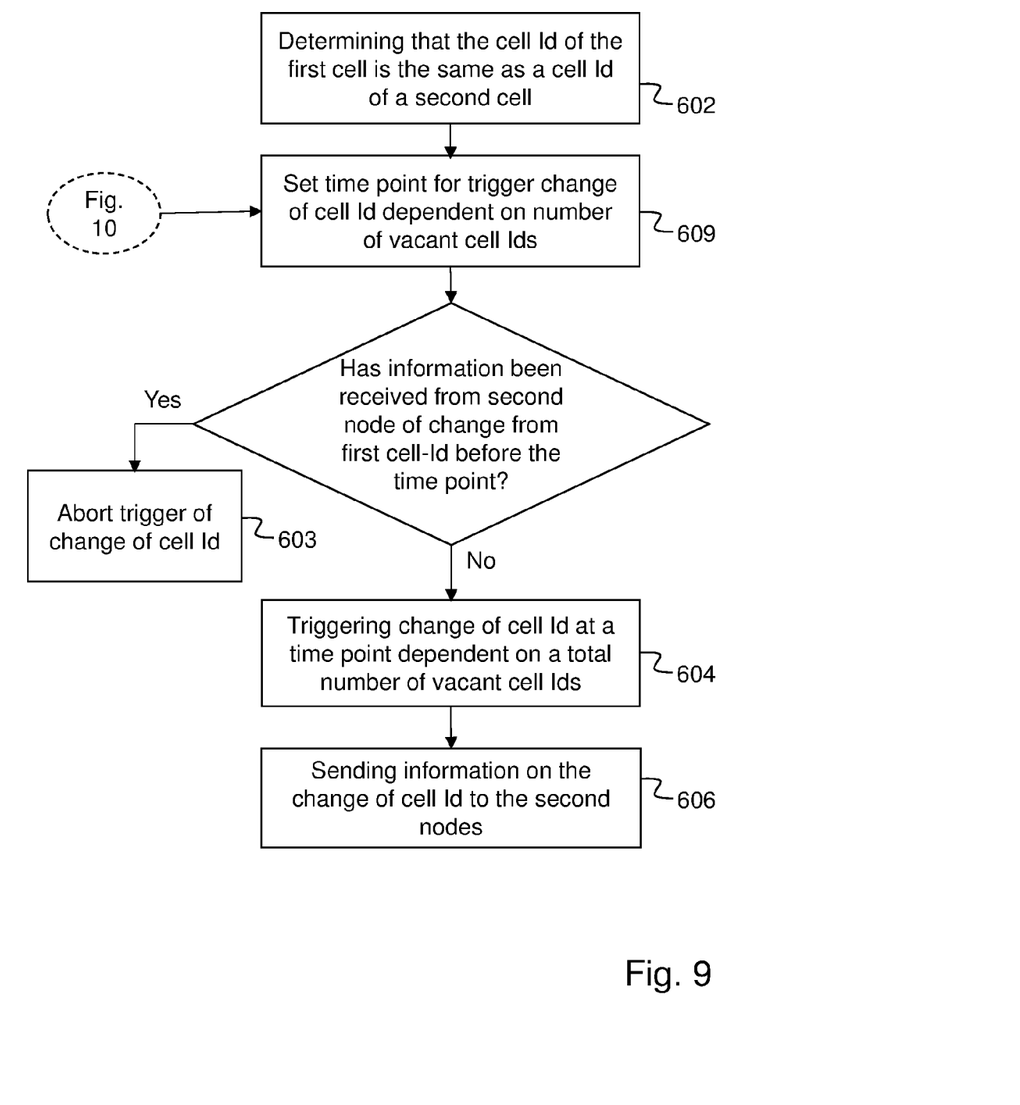

FIG. 9, in conjunction with FIG. 7, shows another embodiment of the invention. In this embodiment, the same numerals refers to the same steps as in FIG. 8, as long as nothing else is stated. The method also refers to the method described in FIG. 8. According to an embodiment, the method (of FIG. 8) further comprises aborting 603 the triggering 604 of cell identity change and the sending 606 of information on the change of cell identity, when receiving, before the cell identity change has been triggered, information from the at least one second radio node on a change of cell identity from the first cell identity to a third cell identity performed by the at least one second radio node. Hereby, unnecessary triggering of change of cell identity could be avoided, reducing impact on traffic in the first cell as well as avoiding unnecessary signalling of information of new cell identities.

Figure 10:
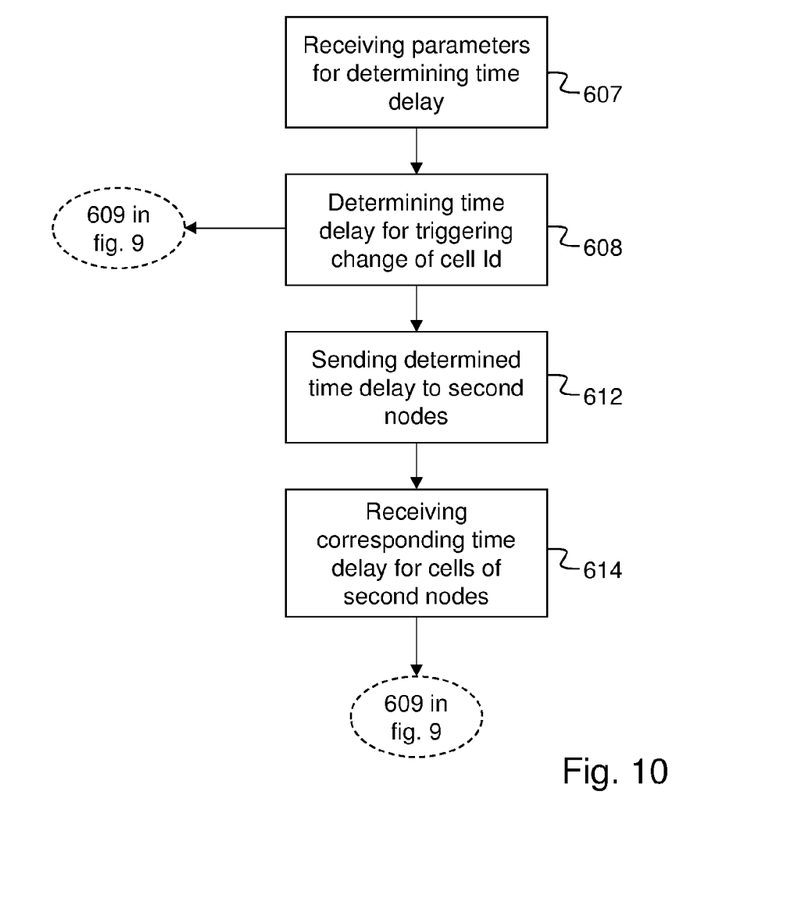

According to an embodiment described in FIG. 9, the first radio node sets 609 the time point for triggering change of cell Id dependent on the number of vacant cell Ids. The method may further comprise, as shown in FIG. 10, determining 608, by the first radio node, the time delay for triggering change of cell identity for the first cell based on the number of vacant cell identities for the first cell. Alternatively, the first radio node receives the time point, or alternatively the time delay, from any of the second radio nodes or from a network management node, such as the DM or NM. The radio node then sets the time point for triggering change of cell Id based on the determined time delay or the received time delay or time point. According to an embodiment, the method further comprises receiving 607 parameters for the determining 608 of the time delay from any of the second radio nodes or from a network management node. In this way, an operator of a network management system can control the setting of the time point for triggering change of cell Id based on the number of vacant cell Ids even though it does not determine the time point or time delay itself.

According to an embodiment, the time delay from the determining 602 to the triggering 604 of the change of cell identity comprises a first time delay dependent on the number of vacant cell identities for the first cell, and a second time delay that is shorter than a difference between two first time delays for two consecutive number of vacant cell identities, wherein the second time delay is added or subtracted from the first time delay. Hereby, a cell identity change collision is avoided in the case when the number of vacant cell identities are the same in the first cell as in the one of the second cell that experiences the collision. The expression "a difference between two first time delays for two consecutive number of vacant cell identities" signifies the difference between a first time delay for n number of vacant cell Ids and a first time delay for n+1 number of vacant cell Ids. The second time delay is then shorter than this difference. This means that the time delay for a cell having n vacant cell Ids is time delay (n)=first time delay (n)+/− second time delay (n), and time delay (n−1)<time delay (n)<time delay (n+1). According to an alternative of this embodiment, the second time delay is a random timer value. According to another alternative of this embodiment, the second time delay is set dependent on a unique cell identity. Hereby the (however small) risk that a collision would occur due to the second time delay being the same for two cells, or so similar that a collision may occur anyhow, is avoided.

According to another embodiment, the change of cell identity is triggered only during a set time interval of a day. Hereby, such change of cell identity could be set to take place when traffic is low in the cell, for example at night time, whereby impact on existing traffic in the network could be reduced.

According to another embodiment, shown in FIG. 10, the method further comprise sending 612, to the at least one second radio node, the determined time delay for triggering change of cell identity, and receiving 614, from the at least one second radio node, corresponding time delays for the cells of the at least one second radio node for triggering change of cell identity at the cells of the at least one second radio node. Such an exchange of time delays could be used by the radio nodes to control that the time delays are mutually different and to change time delays if necessary, to ensure that the first and at least one second radio node have different time delays. Such sending may be triggered when a time delay is changed at the first node.

According to another embodiment, the method further comprises sending, to a network management node, information on the change of cell identity from the first cell identity to the second cell identity.

According to embodiments, a solution is based on letting each eNB take responsibility for resolving its own PCI conflicts by changing to another PCI. When the radio node detects that it has a PCI conflict situation it will trigger an internal PCI changing procedure.

In such a procedure, a first step may be to determine which PCIs that can be used. This can for example be done by starting with the complete set of PCIs. Then the radio node excludes all PCIs that are used by the cells on the own node, used by any neighbor cell of the conflicting cell and used by any neighbors' neighbor cell of the conflicting cell. The remaining PCIs can then be used since they will not cause any new conflict.

In one embodiment, the radio node might start from a reduced set of PCIs for example provided via a message describing a configuration done at the DM. This could for example be the case if some PCIs are reserved for Home-eNBs or other specific type of radio nodes. The radio node may then apply the same procedure as described above in order to exclude the non-suitable PCIs.

Any of the remaining PCIs, after all non-suitable PCIs have been excluded, can be selected as the new PCI for the conflicting cell. In order to prevent two or more cells experiencing a PCI conflict from changing the PCI at the same time, and thereby cause unnecessary traffic disturbance, additional signaling of new PCI values and a possible new conflict, a timer controlling when to change the PCI is introduced. The radio node starts the timer, starting from a timer value when the conflict is detected and changes to a new PCI when the timer expires. The timer value is controlled by the number of available PCIs to choose from. A cell with a large number of available PCIs shall change to a new PCI quicker than a cell with few available PCIs. One example of a function to control the timer value is:

$$\text{timer value} = f(\text{available } PCIs) = \frac{k}{n_{free\ PCIs}}$$

where $n_{free\ PCIs}$ is the number of available PCIs for the cell and k is a constant.

With the suggestion above, a PCI will be changed at the same time for cells that have equal amount of PCIs to change to. To prevent this, the following alternative function can be used to set the timer value:

$$\text{timer value} = g(\text{available } PCIs) = \frac{k}{n_{free\ PCIs}} + t_{rand}$$

where $t_{rand}$ is a random term. The intention is to separate the timer values for equal number of vacant PCIs so that two radio nodes do not change PCI at the same time. The interval for the random term could be chosen to [0,u[, where u could be selected so a PCI change will not be triggered at the same time for two cells with adjacent numbers of free PCIs and therefor increase the probability that only one PCI change at a time is triggered.

A more deterministic approach could be to include some cell unique property into the timer value calculation. This will ensure that two cells do not change PCI at the same time. One example of such a cell property is the ECGI. This is a unique cell id and by letting it be included into the timer value calculation it can be ensured that two cells will not change its PCIs at the same time. The following formula is one example of how the timer value could be calculated:

$$\text{timer value} = h(\text{available } PCIs, ECGI) = \frac{k}{n_{free\ PCIs}} + t_{ECGI}$$

The term $t_{ECGI}$ represents a unique mapping between the ECGI and an added time. In this case it is also beneficial to let the $t_{ECGI}$ be in and interval [0,a[ where a is chosen to ensure that two different numbers of available PCIs never can result in the same timer value.

The above mentioned functions should be considered to be examples of functions that can be used for calculating the timer value. They can be replaced with alternative functions that have the same basic properties. They need to be able to assure that every number of available PCIs represents a unique timer value. Another example of functions that can be used is:

$$\text{timer value} = f(\text{available PCIs}) = 505k * n_{free\ PCIs}$$

When the PCI of a cell has been changed, the radio node will update its neighboring radio nodes with the new configuration. The neighboring radio nodes will then send an update to their neighboring radio nodes regarding the change. When the information reaches the other radio node(s) which cell(s) are involved in the PCI conflict, they will realize that the conflict has been resolved and that they can keep the current PCI of their cell. The PCI changing procedure will then be interrupted without any change, since it is no longer necessary to change.

One optional addition to the solution described above is to also introduce a time interval during the day where PCI changes are allowed. The motivation could be to reduce impact on traffic. Operators often define a maintenance window in a period of the day where impact on traffic is low. The solution described above can be modified so that the timer is not started until the maintenance window occurs. The effect will be that the PCI change procedure can be postponed, but if all nodes enter the maintenance window simultaneously the node with the shortest timer value will still be changing PCI first.

In one embodiment the parameters in the formula calculating timer value can be set from the DM using a configuration message. This is however optional and not necessary. One other alternative is to have the parameters hard coded in the radio node and not configurable. In one embodiment the timer values can be exchanged between the radio nodes that initiate a PCI change procedure. This can be done to ensure that the nodes have different timer values and thereby mitigate the risk that both nodes change their PCIs. In one embodiment, the radio nodes may send new timer value information to all its neighbors when the timer value has changed, e.g. due to changed set of free PCI values.

In another embodiment the timer values can be sent to the DM in order to inform about the change or that a PCI changing procedure has been initiated. In one embodiment the information regarding the PCI change can be signaled to the DM.

Figure 11:
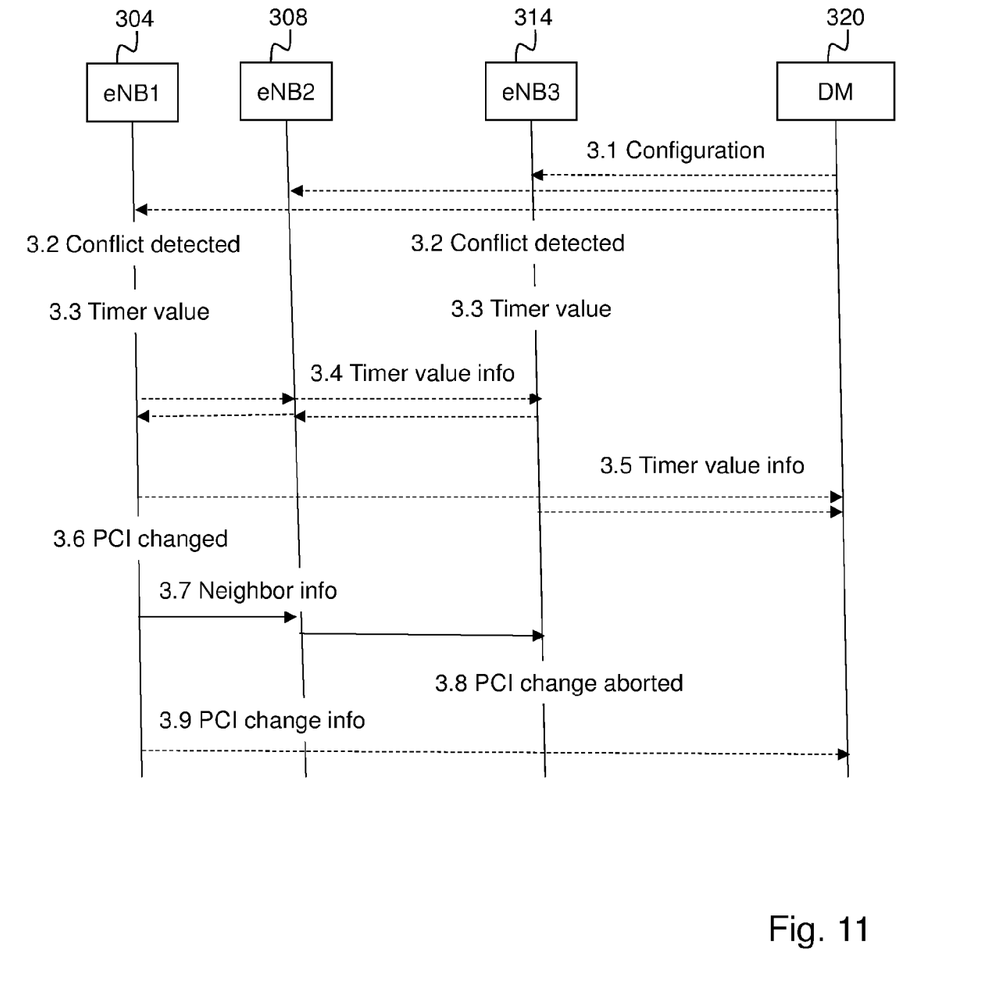
FIG. 11 is a sequence diagram describing a method for resolving PCI conflicts according to a possible embodiment.

An embodiment of a procedure of the present invention is illustrated by the sequence diagram of FIG. 11, where the dashed arrows represents optional steps of the invention. The procedure may start by an optional step of the DM sending a configuration message 3.1 to the eNB1, eNB2 and eNB3. The configuration message may comprise parameters that the eNBs use for calculating the timer values. Thereafter, eNB1 and eNB3 detects 3.2 a PCI conflict for one of its respective cells, i.e. that a cell of the eNB1 and a cell of the eNB3 has the same PCI value. The eNB1 and eNB3 then obtains 3.3 (either before or after the conflict was detected) their individual timer value determining a time delay from detecting the conflict until the PCI is changed. The timer value/time delay may be calculated based on the parameters received from the DM in the configuration step. The obtained timer values are dependent on a total number of vacant cell identities for the cells experiencing a PCI conflict so that the time delay is shorter for the cell that has the most vacant cell identities than for the cell that has the least vacant cell Ids. In this example, the cell of eNB1 has the most vacant cell Ids. Thereafter, an optional step of exchanging 3.4 information of the timer values obtained by eNB1 and eNB3 is performed between the eNB1, eNB2 and eNB3. Also, the DM may be informed 3.5 of the obtained timer values. As eNB1 had shortest time delay, it will then change 3.6 the PCI for its cell to a vacant PCI when its timer elapses, and send information 3.7 of the PCI change to its neighbors. In case the eNB3 is a neighbor's neighbor of eNB1, the information of the PCI change may reach eNB3 via eNB2. When the eNB3 has received the information of the PCI change, the countdown of the timer at eNB3 is stopped and the PCI change that was to take place when the timer of eNB3 was at zero is aborted 3.8. Further, the DM may be informed 3.9 of the PCI change by the eNB1.

In an embodiment, the respective eNB involved in the conflict, i.e. eNB1 and eNB3 in FIG. 11, calculate its individual number of available PCIs based on information of its total number of available PCIs minus the PCIs used by its own cells, the PCIs used by its neighbor cells and the PCIs used by its neighbor's neighbor cells. The respective eNB then sets its timer value based on the calculated number of available PCIs. In another embodiment, the procedure may be set on hold until the eNB is in a maintenance window. When in a maintenance window, the timer may be set and the countdown may start.

Figure 12:
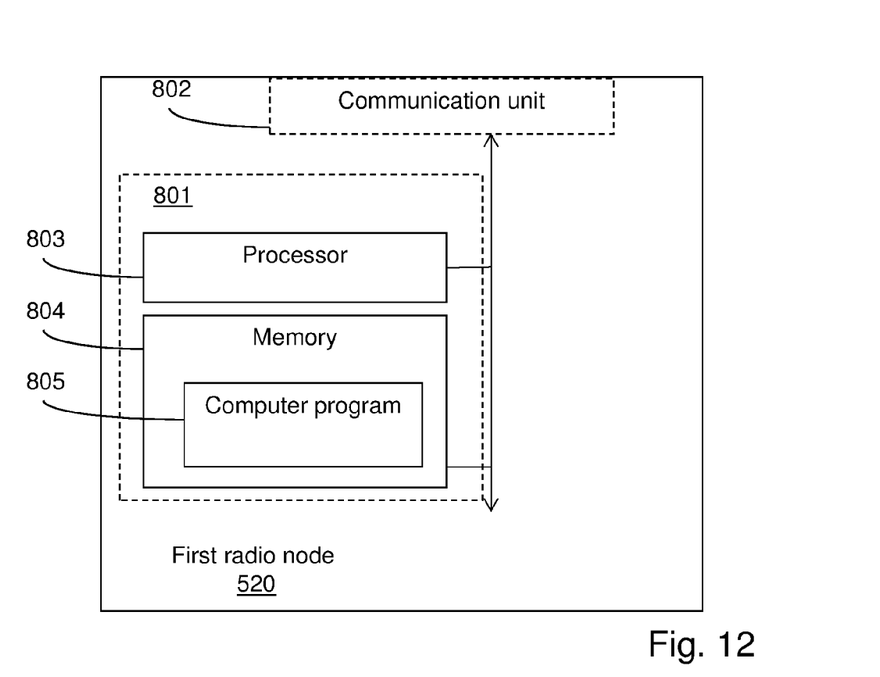
FIGS. 12-13 are schematic block diagrams illustrating a radio node in more detail, according to possible embodiments.

FIG. 12, in conjunction with FIG. 7, shows a first radio node 520 operable in a wireless communication network 500, and arranged for handling cell identities. The first radio node 520 is arranged to provide radio coverage to a first cell 521. The first radio node is further connected to at least one second radio node 530, 540, 550, 560, 570, each second radio node being arranged to provide radio coverage to a second cell 531, 541, 551, 561, 571. The first cell has been assigned a first cell identity, and each of the second cells has been assigned an individual cell identity. The first radio node 520 comprising a processor 803 and a memory 804. The memory contains instructions executable by said processor, whereby the first radio node 520 is operative for determining, based on information on the first cell identity and on the cell identities assigned to the second cells 531, 541, 551, 561, 571, that the first cell identity is the same as the cell identity assigned to one of the second cells. The first radio node 520 is further operative for, based on the result of the determining, triggering change of cell identity for the first cell 521, from the first cell identity to a second cell identity that is not used for any of the second cells, wherein the change of cell identity is triggered at a time point corresponding to a time delay from the determining to the triggering that is dependent on a total number of vacant cell identities for the first cell so that the time delay is shorter the more vacant cell identities there are for the first cell. Further, the first radio node 520 is operative for sending, to the at least one second radio node, information on the change of cell identity from the first cell identity to the second cell identity. According to an embodiment, the information on the change of identity may be sent either directly or via another node.

According to an embodiment, the first radio node 520 is operative for aborting the triggering of cell identity change and the sending of information on the change of cell identity, when receiving, before the cell identity change has been triggered, information from the one of the second radio node on a change of cell identity from the first cell identity to a third cell identity performed by the one of the second radio node.

According to another embodiment, the first radio node 520 is further operative for determining the time delay for triggering change of cell identity for the first cell based on the number of vacant cell identities for the first cell.

According to another embodiment, the first radio node 520 is further operative for receiving parameters for the determining of the time delay from any of the at least one second radio node or from a network management node.

According to another embodiment, the time delay from the determining to the triggering of the change of cell identity comprises a first time delay dependent on the number of vacant cell identities for the first cell, and a second time delay that is shorter than a difference between two first time delays for two consecutive number of vacant cell identities, wherein the second time delay is added to or subtracted from the first time delay.

According to another embodiment, the second time delay is a random timer value.

According to a further embodiment, the second time delay is set dependent on a unique cell identity.

According to another embodiment, the first radio node 520 is operative for triggering the change of cell identity only during a set time interval of a day.

According to another embodiment, the first radio node 520 is further operative for sending, to the at least one second radio node, the determined time delay for triggering change of cell identity, and receiving, from the at least one second radio node, corresponding time delays for the cells of the at least one second radio node for triggering change of cell identity at the cells of the at least one second radio node.

According to another embodiment, the first radio node 520 is further operative for sending, to a network management node, information on the change of cell identity from the first cell identity to the second cell identity.

According to other embodiments, the first radio node 520 may further comprise a communication unit 802 (see FIG. 12), which may be considered to comprise conventional means for communicating with wireless communication devices, such as a transmitter and a receiver, or a transceiver, arranged for wireless communication. The communication unit 802 may further be arranged for communication with other nodes of the communication network 100, such as other radio nodes, e.g. the second radio nodes 530, 540, 550, 560, 570 of FIG. 7, and/or core network nodes, probably via wireline. The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above.

The computer program 805 may comprise computer readable code means, which when run in the first radio node 520 causes the first radio node to perform the steps described in any of the described embodiments of the first radio node. The computer program 805 may be carried by a computer program product connectable to the processor 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the first radio node 520 has access via the communication unit 802. The computer program may then be downloaded from the server into the memory 804.

Figure 13:
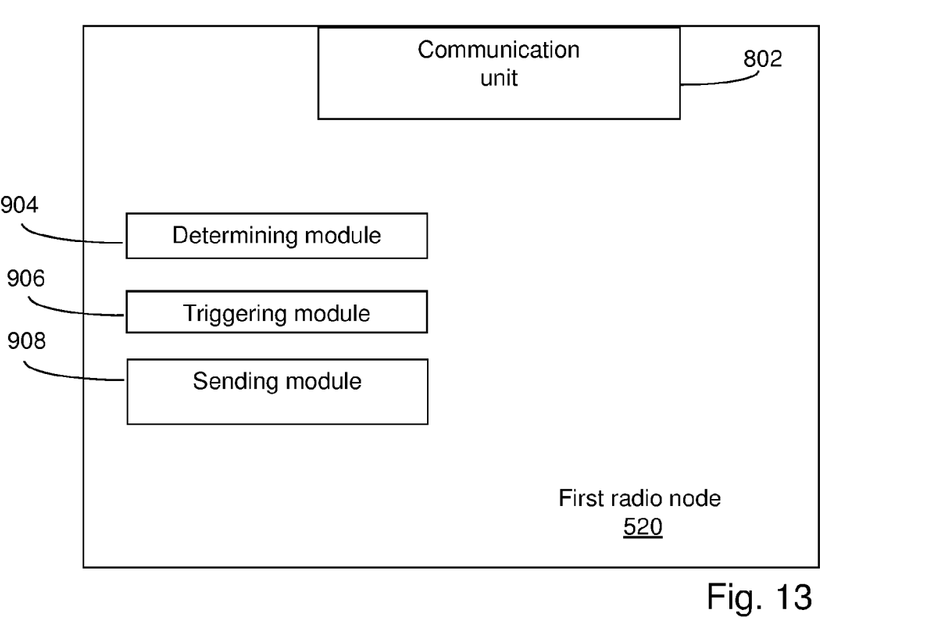

FIG. 13, in conjunction with FIG. 7, shows another embodiment of a first radio node 520 operable in a wireless communication network 500, and arranged for handling cell identities. The first radio node 520 is arranged to provide radio coverage to a first cell 521. The first radio node is connected to at least one second radio node 530, 540, 550, 560, 570, each second radio node being arranged to provide radio coverage to a second cell 531, 541, 551, 561, 571. The first cell has been assigned a first cell identity, and each of the second cells has been assigned an individual cell identity. The first radio node 520 comprises a determining module 904 for determining, based on information on the first cell identity and on the cell identities assigned to the second cells 531, 541, 551, 561, 571, that the first cell identity is the same as the cell identity assigned to one of the second cells. The first radio node further comprises a triggering module 906 for triggering change of cell identity for the first cell 521, based on the result of the determining, from the first cell identity to a second cell identity that is not used for any of the second cells, wherein the change of cell identity is triggered at a time point corresponding to a time delay from the determining to the triggering that is dependent on a total number of vacant cell identities for the first cell so that the time delay is shorter the more vacant cell identities there are for the first cell. The first radio node further comprises a sending module 908 for sending, to the at least one second radio node, information on the change of cell identity from the first cell identity to the second cell identity. The first radio node may further have a communication unit 802, similar to the communication unit 802 described in FIG. 12.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional. Further, even though the methods and procedures described comprise steps that are written in a certain order, the methods and procedures do not have to be executed in that order unless explicitly so defined.

The invention claimed is:

1. A method for handling of cell identities, performed by a first radio node of a wireless communication network, wherein the first radio node provides radio coverage to a first cell, the first radio node being connected to at least one second radio node, each second radio node providing radio coverage to a second cell, wherein the first cell has been assigned a first cell identity, and each of the second cells has been assigned an individual cell identity, the method comprising:
   determining, based on information on the first cell identity and on the cell identities assigned to the second cells, that the first cell identity is the same as the cell identity assigned to one of the second cells,
   based on the result of the determining, triggering change of cell identity for the first cell, from the first cell identity to a second cell identity that is not used for any of the second cells, wherein the change of cell identity is triggered at a time point corresponding to a time delay from the determining to the triggering that is dependent on a total number of vacant cell identities for the first cell so that the time delay is shorter when more vacant cell identities there are for the first cell, and wherein the method further comprises
   sending, to the at least one second radio node, information on the change of cell identity from the first cell identity to the second cell identity,
   wherein the time delay from the determining to the triggering of the change of cell identity comprises a first time delay dependent on the number of vacant cell identities for the first cell, and a second time delay that is shorter than a difference between two first time delays for two consecutive number of vacant cell identities, wherein the second time delay is added to or subtracted from the first time delay.

2. Method according to claim 1, further comprising:
   aborting the triggering of cell identity change and the sending of information on the change of cell identity, when receiving, before the cell identity change has been triggered, information from the one of the second radio node on a change of cell identity from the first cell identity to a third cell identity performed by the one of the second radio node.

3. Method according to claim 1, further comprising:
   determining the time delay for triggering change of cell identity for the first cell based on the number of vacant cell identities for the first cell.

4. Method according to claim 3, further comprising:
   receiving parameters for the determining of the time delay from any of the at least one second radio node or from a network management node.

5. Method according to claim 1, wherein the second time delay is a random timer value.

6. Method according to claim 1, wherein the second time delay is set dependent on a unique cell identity.

7. Method according to claim 1, wherein the change of cell identity is triggered only during a set time interval of a day.

8. Method according to claim 1, further comprising:
   sending, to the at least one second radio node, the determined time delay for triggering change of cell identity, and
   receiving, from the at least one second radio node, corresponding time delays for the cells of the at least one second radio node for triggering change of cell identity at the cells of the at least one second radio node.

9. Method according to claim 1, further comprising:
   sending, to a network management node, information on the change of cell identity from the first cell identity to the second cell identity.

10. A first radio node operable in a wireless communication network, and arranged for handling cell identities, the first radio node being arranged to provide radio coverage to a first cell, the first radio node being connected to at least one second radio node, each second radio node being arranged to provide radio coverage to a second cell, wherein the first cell has been assigned a first cell identity, and each of the second cells has been assigned an individual cell identity, the first radio node comprising:
   a processor; and
   a memory, said memory containing instructions executable by said processor, whereby the first radio node is operative to:
   determine, based on information on the first cell identity and on the cell identities assigned to the second cells, that the first cell identity is the same as the cell identity assigned to one of the second cells,
   based on the result of the determining, trigger change of cell identity for the first cell, from the first cell identity to a second cell identity that is not used for any of the second cells, wherein the change of cell identity is triggered at a time point corresponding to a time delay from the determining to the triggering that is dependent on a total number of vacant cell identities for the first cell so that the time delay is shorter when more vacant cell identities there are for the first cell, and send, to the at least one second radio node, information on the change of cell identity from the first cell identity to the second cell identity, wherein the time delay from the determining to the triggering of the change of cell identity comprises a first time delay dependent on the number of vacant cell identities for the first cell, and a second time delay that is shorter than a difference between two first time delays for two consecutive number of vacant cell identities, wherein the second time delay is added to or subtracted from the first time delay.

11. First radio node according to claim 10, said memory containing instructions executable by said processor, whereby the first radio node is further operative to:

abort the triggering of cell identity change and the sending of information on the change of cell identity, when receiving, before the cell identity change has been triggered, information from the one of the second radio node on a change of cell identity from the first cell identity to a third cell identity performed by the one of the second radio node.

12. First radio node according to claim 10, said memory containing instructions executable by said processor, whereby the first radio node is further operative to:

determine the time delay for triggering change of cell identity for the first cell based on the number of vacant cell identities for the first cell.

13. First radio node according to claim 12, said memory containing instructions executable by said processor, whereby the first radio node is further operative to:

receive parameters for the determining of the time delay from any of the at least one second radio node or from a network management node.

14. First radio node according to claim 10, wherein the second time delay is a random timer value.

15. First radio node according to claim 10, wherein the second time delay is set dependent on a unique cell identity.

16. First radio node according to claim 10, operative for triggering the change of cell identity only during a set time interval of a day.

17. First radio node according to claim 10, said memory containing instructions executable by said processor, whereby the first radio node is further operative to:

send, to the at least one second radio node, the determined time delay for triggering change of cell identity, and receive, from the at least one second radio node, corresponding time delays for the cells of the at least one second radio node for triggering change of cell identity at the cells of the at least one second radio node.

18. First radio node according to claim 10, said memory containing instructions executable by said processor, whereby the first radio node is further operative to:

send, to a network management node, information on the change of cell identity from the first cell identity to the second cell identity.

* * * * *